US006026579A

United States Patent [19]

Autrey

[11] Patent Number: 6,026,579

[45] Date of Patent: Feb. 22, 2000

[54] FOLDABLE GEOSTATIONARY SATELLITE ANTENNA POINTING GUIDE AND METHOD

[75] Inventor: Timothy N. Autrey, Fort Wayne, Ind.

[73] Assignee: Hughes Electronics Corporation, El Segundo, Calif.

[21] Appl. No.: 08/864,058

[22] Filed: May 27, 1997

[51] Int. Cl.[7] .................................................... G01C 21/02

[52] U.S. Cl. ............................ 33/15 B; 33/15 C; 33/431

[58] Field of Search ................................ 33/15 B, 15 C, 33/431, 562, 563, 566

[56] References Cited

U.S. PATENT DOCUMENTS

| | | | |
|---|---|---|---|
| 1,086,213 | 2/1914 | Pleasants | 33/1 SB |
| 3,754,702 | 8/1973 | Schwarz et al. | 235/7 A |
| 4,586,906 | 5/1986 | Buccieri | 434/64 |
| 5,007,174 | 4/1991 | Cook | 33/1 SD |

*Primary Examiner*—Bernard Roskoski
*Attorney, Agent, or Firm*—Michael W. Sales

[57] ABSTRACT

In a preferred embodiment, a foldable geostationary satellite antenna pointing guide (FIG. 4, 40), comprising: at least a first panel (42) including on a front surface thereof a first portion of a world map; a flexible transparent overlay panel (50) attached to said at least a first panel (42) and having printed thereon scales of degrees of azimuth and elevation, a central point thereof representing ninety degrees elevation; said transparent overlay panel (50) being foldable over said front surface of said at least a first panel (42) and moveable with respect thereto such that said central point can be positioned over the location of a first geostationary satellite (46) on said first portion of a world map, such that a user can locate said user's position on said first portion of a world map and read from said scales of degrees of azimuth and elevation, at said position, an optimum direction to point a radio antenna toward said first geostationary satellite (46).

10 Claims, 6 Drawing Sheets

FOLDABLE GEOSTATIONARY SATELLITE ANTENNA POINTING GUIDE AND METHOD

BACKGROUND OF THE INVENTION

1. Field of the Invention

The present invention relates to radios which communicate via geostationary satellites generally and, more particularly, but not by way of limitation, to a novel foldable geostationary satellite pointing guide.

2. Background Art

Many field military personnel are equipped with portable radios which communicate via geostationary satellites with base stations and/or other portable radios. For the best quality communications, it is necessary that the antennas of such radios be pointed at one of the satellites, preferably the nearest satellite. In order to determine the location of a satellite, the personnel are also equipped with pocket guides having a planar base member of semi-rigid plastic and having printed thereon a map of the world. A transparent slide is movable along the base member and has printed thereon scales of azimuth and elevation degrees. In use, the slide is moved along the base until the center of the slide is positioned over a selected satellite location. Then, azimuth and elevation degrees are read over the location of the person on the map and used to point the radio antenna. The base of the guide is approximately 3¾ inches by 10 inches. Because of its size, the guide extends out of a person's pocket and tends to fall out of the pocket or interfere with other activities of the person.

Particular features, elements, and advantages of the present invention, will be elucidated in, or be apparent from, the following description and the accompanying drawing figures.

SUMMARY OF THE INVENTION

The present invention provides, in a preferred embodiment, a foldable geostationary satellite antenna pointing guide, comprising: at least a first panel including on a front surface thereof a first portion of a world map; a flexible transparent overlay panel attached to said at least a first panel and having printed thereon scales of degrees of azimuth and elevation, a central point thereof representing ninety degrees elevation; said transparent overlay panel being foldable over said front surface of said at least a first panel and moveable with respect thereto such that said central point can be positioned over the location of a first geostationary satellite on said first portion of a world map, such that a user can locate said user's position on said first portion of a world map and read from said scales of degrees of azimuth and elevation, at said position, an optimum direction to point a radio antenna toward said first geostationary satellite.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Figure 1:
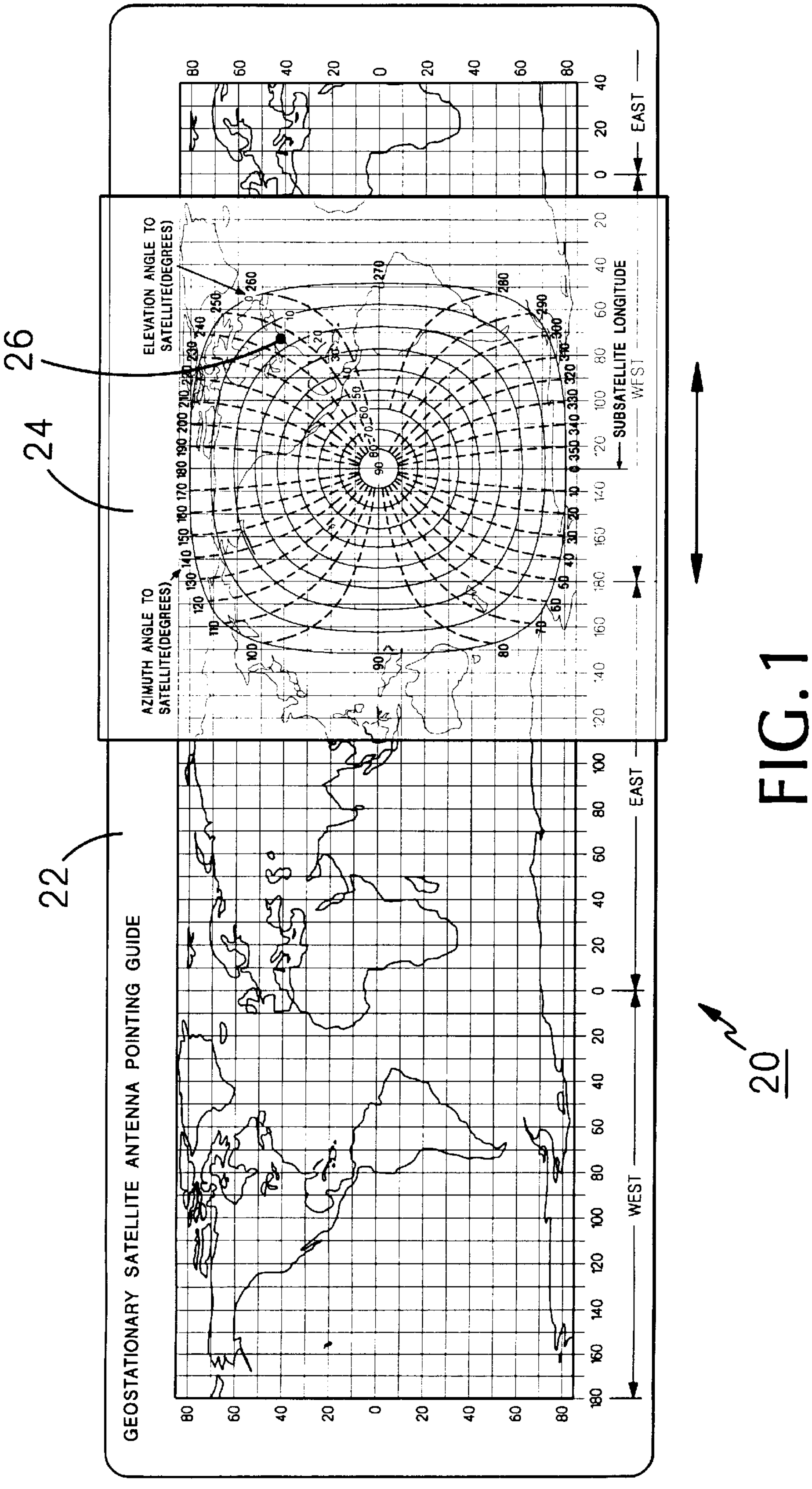
FIG. 1 (PRIOR ART)
FIG. 1 is top plan view of a conventional geostationary satellite antenna pointing guide.

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

FIG. 1 illustrates a conventional geostationary satellite antenna pointing guide, generally indicated by the reference numeral 20. Guide 20 includes a base member 22 which, as noted above, is formed from a semi-rigid plastic material and measures approximately 3¾ inches (10 centimeters) by 10 inches (25 centimeters). A map of the world is printed on base member 22 and a transparent slide 24 is movable back and forth along the length of the base member, as indicated by the double-headed arrow, and has printed thereon scales of degrees of azimuth and elevation. The concentric, rounded squares in solid lines represent degrees of elevation from "0" to 90", while the radiating arcuate broken lines represent azimuth degrees from "0" to "360".

In use, slide 24 is moved along base member 22 until the center of the slide, at "90" degrees, is over a chosen satellite along the earth's equator. Then, the user's position on the map is determined and azimuth and elevation degrees read from the scales on slide 24, the azimuth and elevation degrees being used to point the antenna of the user's radio toward the satellite. For example, assume that the "90" degree point on slide 24 is, in fact, over a chosen satellite on FIG. 1. Assume, further, that the user is in the vicinity of New York, N.Y., as indicated by reference numeral 26. Then, the user, employing the scale on slide 24 would read elevation of approximately 18 degrees and azimuth of approximately 246 degrees and use those figures to point a radio antenna toward the satellite.

Figure 2:
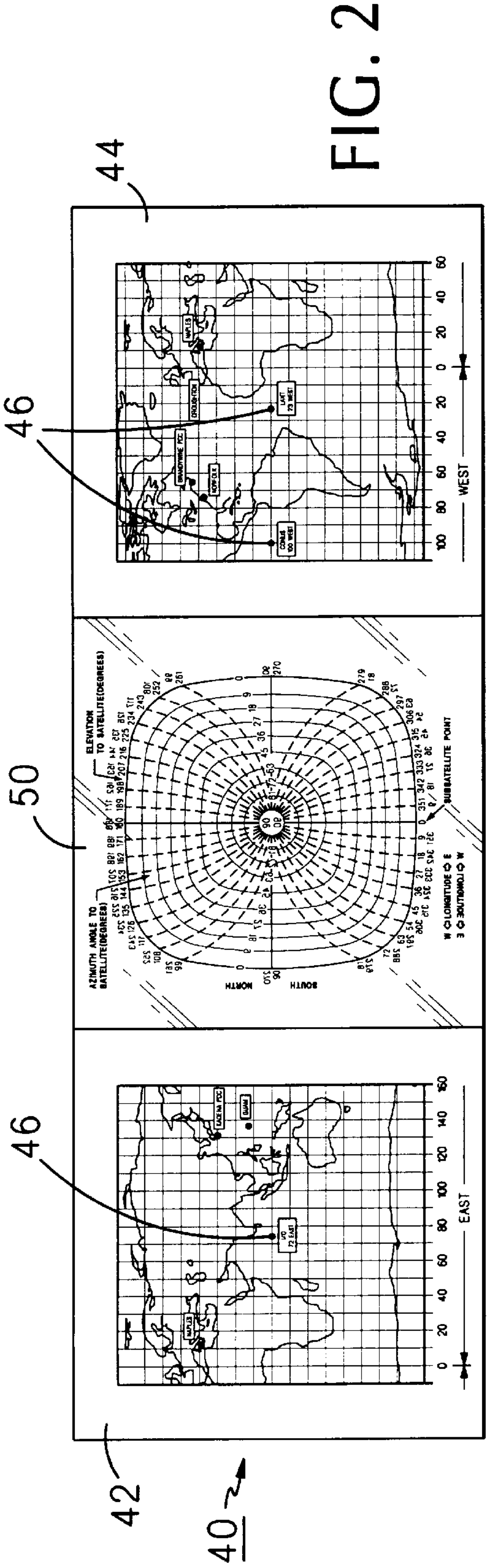
FIG. 2 is a front elevational view of a foldable geostationary satellite antenna pointing guide constructed according to the present invention.
Figure 3:
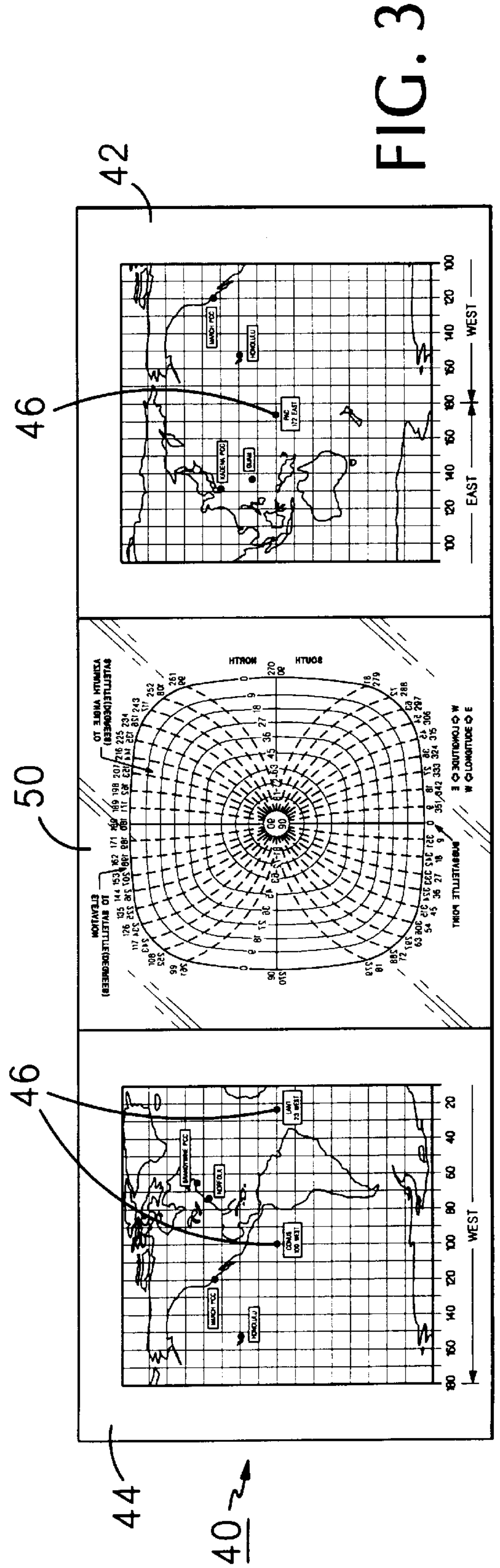
FIG. 3 is a rear elevational view of the foldable geostationary satellite antenna pointing guide.

FIGS. 2 and 3 are front and rear views, respectively, of a geostationary satellite antenna pointing guide, generally indicated by the reference numeral 40, constructed according to the present invention. Guide 40 includes first and second side panels 42 and 44, respectively, each side of each panel including a portion of a map of the world, with the portions of the map being chosen so that one of four selected geostationary satellites 46 is positioned at the center of the sides of the panels. Side panels 42 and 44 are joined by an overlay panel 50 which is transparent and has printed thereon scales of azimuth and elevation similar to those on slide 24 (FIG. 1).

The graphics in first and second side panels 42 and 44 and center panel 50 may be laminated in a clear, flexible plastic material by conventional methods. It is desirable, as will become evident below, that center panel 50 be highly flexible and that side panels 42 and 44 be somewhat stiffer than the center panel.

Figure 4:
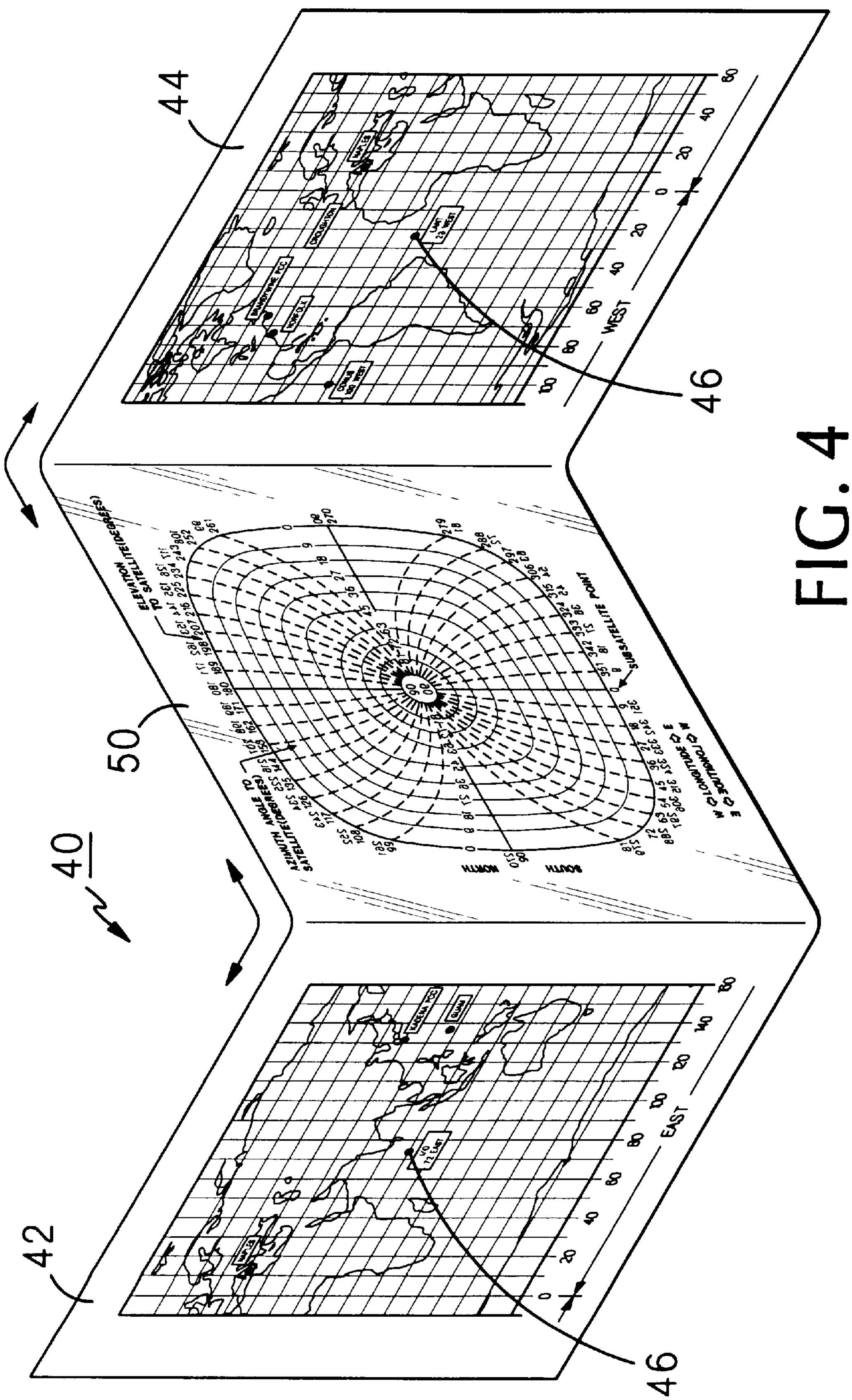
FIG. 4 is an isometric view of the foldable geostationary satellite antenna pointing guide.

As is seen on FIG. 4, first and second side panels 42 and 44 and center panel 50 are hingedly joined, as indicated by the double-headed arrows, so that the center panel may be folded over the rear surface of first side panel 42 or the front surface of second side panel 44. The hinged connections also permit center panel 50 to be folded over the front surface of first side panel 42 or the rear surface of second side panel 44. Using the laminated construction, noted above, and a flexible plastic material.

Figure 5:
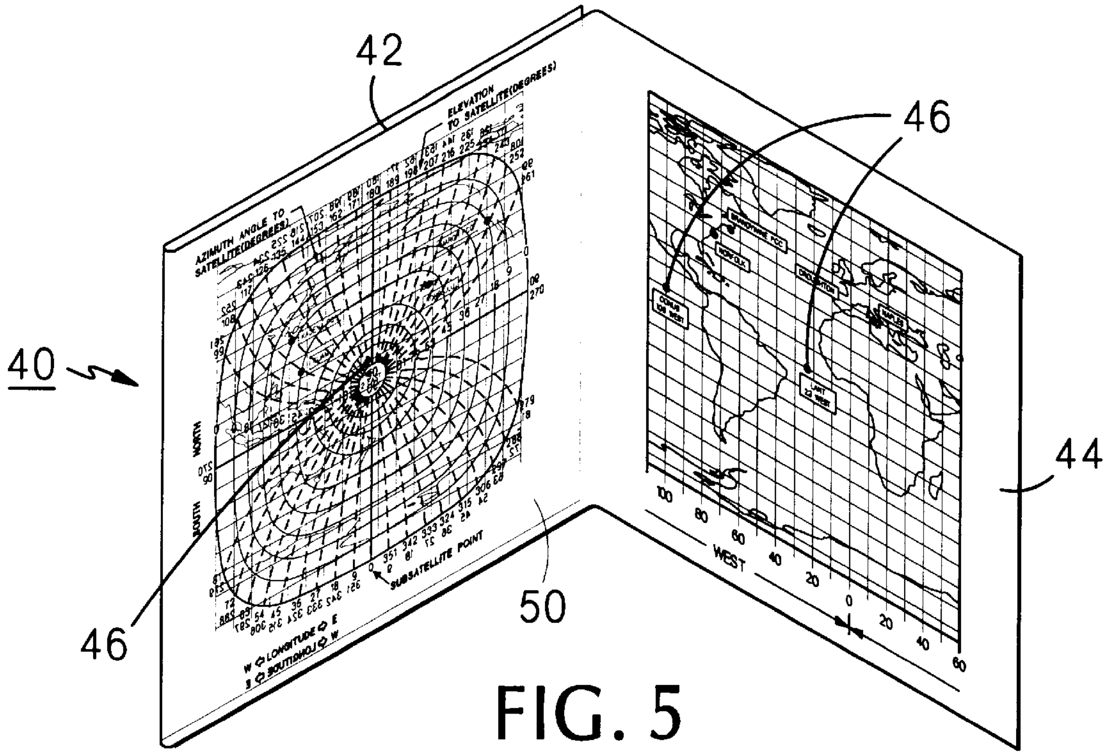
FIGS. 5 and 6 are isometric views of the foldable geostationary satellite antenna pointing guide in use.

FIG. 5 illustrates guide 40 in use. Here, center panel 50 has been folded over the rear surface of first side panel 42. This brings the center, at "90" degrees, of the azimuth and elevation scales directly over the satellite 46 identified as "PAC 172" EAST". Now, as was the case with guide 20 (FIG. 1), the user locates the user's position on the map on the rear surface of side panel 42 and reads the azimuth and elevation scales, as is described above with reference to FIG. 1, to determine the optimum antenna pointing position for the user's radio in order to communicate with satellite "PAC 172EAST".

As indicated above, guide 40 has been constructed so that the optimum antenna pointing position for a selected one of four given satellites may be easily determined. However, the use of guide 40 is not limited to those four satellites and can be used to determine optimum antenna pointing position for other geostationary satellites located over the earth's equator, provided that the longitude of those satellites is known.

Figure 6:
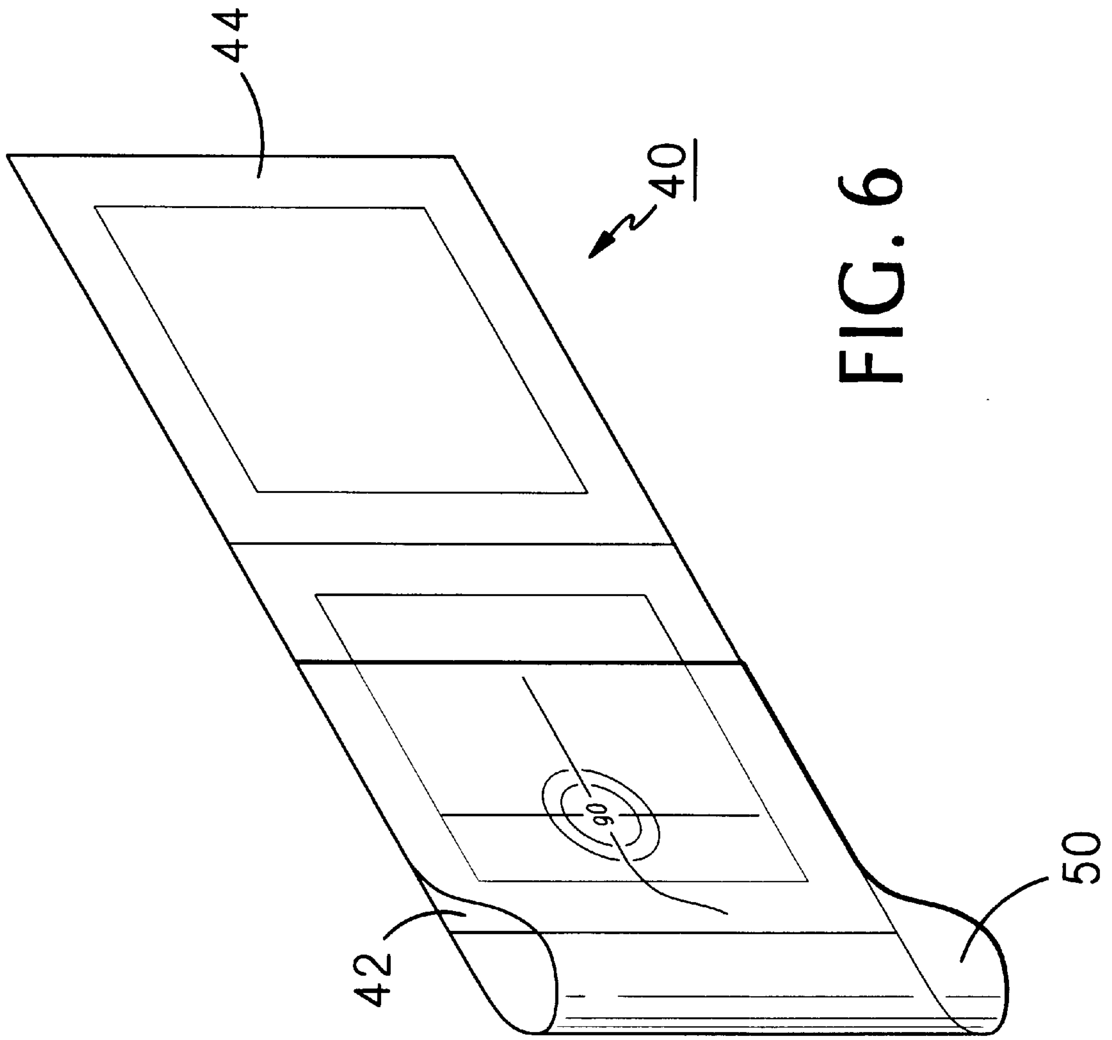

FIG. 6 shows the use of guide 40 when a satellite of interest is not one of the four above. Here, center panel 50 has been folded over first side panel 42 and then the "90" degree center point of the center panel has been moved along the equator until the longitude of the satellite has been reached. It can be seen that it is in this use that having center panel highly flexible is important. As the "90" degree center point is moved to the position shown on FIG. 6, the material of center panel 50 adjacent the attachment to first side panel 42 flexibly gathers in a somewhat arcuate manner, permitting the relocation of the center point. Thus, guide 40 may be used to determine optimum antenna pointing position for a satellite at any longitude along the earth's equator.

Figure 7:
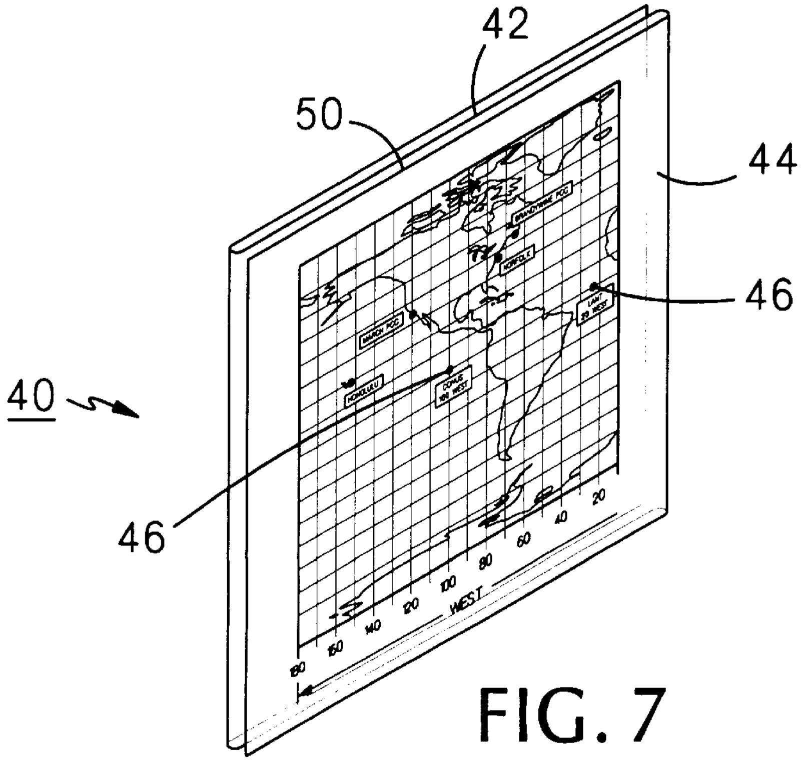
FIG. 7 is an isometric view of the foldable geostationary satellite antenna pointing guide in its folded state.

FIG. 7 illustrates guide 40 in its folded position, the hinge connections permitting panels 42, 44, and 50 to be folded essentially flat. The width and height dimensions of the panels are preferable approximately 3½ inches (9 centimeters) by 3¾ inches (10 centimeters) so that the folded guide 40 may be conveniently carried in a pocket without danger of falling out or interfering with other activities.

Figure 8:
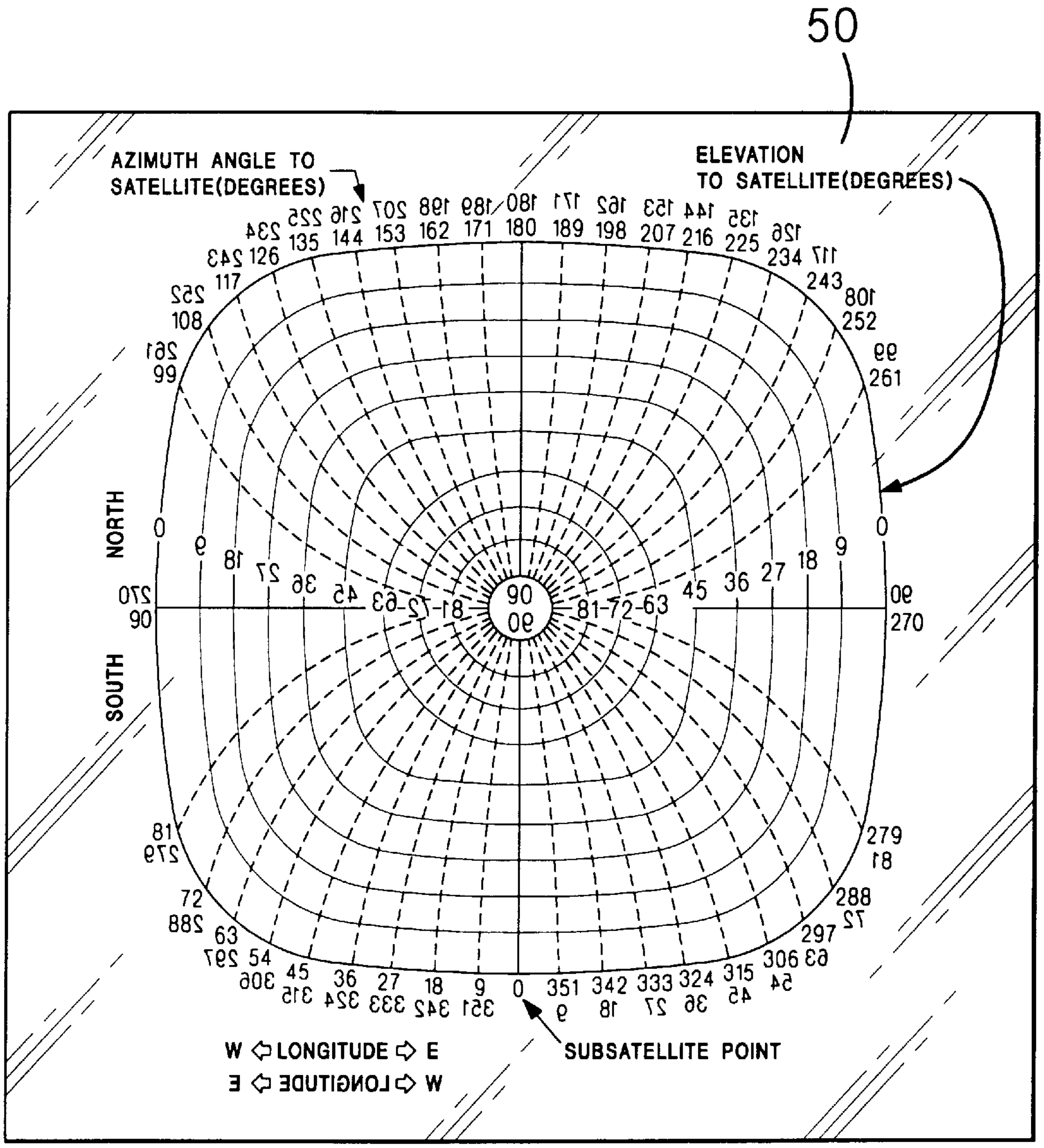
FIG. 8 is an enlarged, front elevational view of the transparent overlay panel for the foldable geostationary satellite antenna pointing guide.

FIG. 8 is an enlarged view of center panel 50 and shows that the numbers on the azimuth and elevation degrees are printed such that the scales may be easily read regardless of whether the center panel is folded over the front or rear surfaces of either side panels 42 and 44. As was the case with the scale on slide 24 on guide 20 (FIG. 1), degrees of elevation are represented by a family of concentric rounded squares, from "0" to "90" degrees, while azimuth degrees are represented by a family of radiating arcuate broken lines, from "0" to "360" degrees.

It will thus be seen that the particular features, elements, and advantages of the present invention elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. A foldable geostationary satellite antenna pointing guide, comprising:

(a) at least a first panel including on a front surface thereof a first portion of a world map;

(b) a flexible transparent overlay panel fixedly attached to said at least a first panel and having printed thereon scales of degrees of azimuth and elevation, and a central point thereof representing ninety degrees elevation;

(c) said flexible transparent overlay panel being foldable over said front surface of said at least a first panel for gathering in a somewhat arcuate manner a portion of said flexible transparent overlay adjacent to said first panel to move said overlay panel with respect to said at least a first panel such that said central point can be positioned over the location of a first geostationary satellite on said first portion of a world map, whereby a user can locate said user's position on said first portion of a world map and read from said scales of degrees of azimuth and elevation, at said position, an optimum direction to point a radio antenna toward said first geostationary satellite;

(d) and further comprising a second side panel attached to said transparent overlay, said second side panel having third and fourth portions of said world map, respectively, on front and rear surfaces thereof; and said transparent overlay being selectively foldable over said front and rear surfaces of said second panel to determine the optimum directions to point said radio antenna toward a selected one of third and fourth geostationary satellites.

2. A foldable geostationary satellite antenna pointing guide, as defined in claim 1, further comprising:

(a) said at least a first panel includes on a rear surface thereof a second portion of a world map; and (b) said flexible transparent overlay panel being foldable over said rear surface of at least a first panel for gathering in a somewhat arcuate manner a portion of said flexible transparent overlay adjacent to said first panel to move said overlay panel with respect to said at least a first panel such that said central point can be positioned over the location of a second geostationary satellite on said second portion of a world map, whereby a user can locate said user's position on said second portion of a world map and read from said scales of degrees of azimuth and elevation, at said position, an optimum direction to point a radio toward said second geostationary satellite.

3. A foldable geostationary satellite antenna pointing guide, as defined in claim 1, wherein: said at least a first and said second side panels have edges hingedly attached to opposite side edges of said transparent overlay panel.

4. A foldable geostationary satellite antenna pointing guide, as defined in claim 1, wherein: said foldable geostationary satellite antenna pointing guide can be folded flat when not in use.

5. A foldable geostationary satellite antenna pointing guide, as defined in claim 4, wherein: when said foldable geostationary satellite antenna pointing guide is folded flat, said foldable geostationary satellite antenna pointing guide has width and height dimensions of approximately 3½ inches (9 centimeters) by 3¾ inches (10 centimeters).

6. A method of determining an optimum direction to point a radio antenna, comprising:

(a) providing a foldable geostationary satellite antenna pointing guide comprising at least a first panel including on a front surface thereof a first portion of a world map and a flexible transparent overlay panel attached to said at least a first panel and having printed thereon scales of degrees of azimuth and elevation, a central point thereof representing ninety degrees elevation;

(b) folding said flexible transparent overlay panel over said front surface of said at least a first panel for gathering in a somewhat arcuate manner a portion of said flexible transparent overlay adjacent to said first panel and moving said transparent panel with respect to said at least a first panel until said central point is positioned over the location of a first geostationary satellite on said first portion of a world map; and (c) locating a user's position on said first portion of a world map and reading from said scales of degrees of azimuth and elevation at said position an optimum direction to point a radio antenna toward said first geostationary satellite;

(d) and further comprising providing a second side panel attached to said transparent overlay, said second side panel having third and fourth portions of said world map, respectively, on front and rear surfaces thereof; and folding said transparent overlay panel being selectively foldable over said front and rear surfaces of said second panel to determine the optimum directions to point said radio antenna toward a selected one of third and fourth geostationary satellites.

7. A method of determining an optimum direction to point a radio antenna, as defined in claim 6, further comprising:

(a) providing said foldable geostationary satellite antenna pointing guide having on a rear surface of said at least a first panel a second portion of said world map;

(b) folding said flexible transparent overlay panel over said rear surface of said at least a first panel for gathering in a somewhat arcuate manner a portion of said flexible transparent overlay adjacent to said first panel and moving said transparent panel with respect to said at least a first panel until said central point is positioned over the location of a second geostationary satellite on said first portion of a world map; and (c) locating a user's position on said second portion of a world map and reading from said scales of degrees of azimuth and elevation at said position an optimum direction to point a radio antenna toward said second geostationary satellite.

8. A method of determining an optimum direction to point a radio antenna, as defined in claim 6, further comprising: providing said at least a first and said second side panels having edges hingedly attached to opposite side edges of said transparent overlay panel.

9. A method of determining an optimum direction to point a radio antenna, as defined in claim 6, further comprising: folding flat said foldable geostationary satellite antenna pointing guide when not in use.

10. A method of determining an optimum direction to point a radio antenna, as defined in claim 9, further comprising: providing said foldable geostationary satellite antenna pointing guide such that when folded flat, said foldable geostationary satellite antenna pointing guide has width and height dimensions of approximately 3½ inches (9 centimeters) by 3¾ inches (10 centimeters).

* * * * *